US007426553B1

(12) United States Patent
Wrape

(10) Patent No.: US 7,426,553 B1
(45) Date of Patent: Sep. 16, 2008

(54) PROVISIONING DATA LINK CONNECTION IDENTIFIERS IN A COMMUNICATIONS NETWORK

(75) Inventor: Jason Wayne Wrape, Monroe, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 799 days.

(21) Appl. No.: 09/921,240

(22) Filed: Aug. 2, 2001

(51) Int. Cl.
G06F 15/173 (2006.01)

(52) U.S. Cl. ............... 709/223; 709/217; 709/218; 709/226; 370/254; 370/395.2; 370/395.3

(58) Field of Classification Search .......... 709/218, 709/250, 229, 201, 223, 249, 230; 370/248, 370/254, 431, 351; 707/10, 103; 715/513
See application file for complete search history.

(56) References Cited

U.S. PATENT DOCUMENTS

| | | | |
|---|---|---|---|
| 5,416,771 A * | 5/1995 | Iwata ................ 370/410 |
| 5,815,495 A * | 9/1998 | Saitoh et al. ........... 370/249 |
| 5,884,297 A * | 3/1999 | Noven ............... 370/395.3 |
| 5,896,496 A * | 4/1999 | Suzuki ................ 714/48 |
| 6,041,349 A * | 3/2000 | Sugauchi et al. ........ 709/223 |
| 6,115,362 A * | 9/2000 | Bosa et al. ........... 370/248 |
| 6,125,119 A | 9/2000 | Cherukuri et al. |
| 6,145,001 A | 11/2000 | Scholl et al. |
| 6,181,679 B1 * | 1/2001 | Ashton et al. .......... 370/244 |
| 6,209,039 B1 * | 3/2001 | Albright et al. ......... 709/249 |
| 6,249,572 B1 * | 6/2001 | Brockman et al. ....... 379/133 |
| 6,278,708 B1 * | 8/2001 | Von Hammerstein et al. .... 370/389 |
| 6,292,495 B1 * | 9/2001 | Von Hammerstein et al. .... 370/465 |
| 6,356,563 B1 * | 3/2002 | Nicoll et al. ........... 370/466 |
| 6,381,641 B1 * | 4/2002 | Iwasaki ............... 709/224 |
| 6,490,620 B1 * | 12/2002 | Ditmer et al. ........... 709/224 |
| 6,539,432 B1 * | 3/2003 | Taguchi et al. .......... 709/227 |
| 6,560,222 B1 * | 5/2003 | Pounds et al. .......... 370/353 |
| 6,584,074 B1 * | 6/2003 | Vasamsetti et al. ..... 370/254 |
| 6,700,890 B1 * | 3/2004 | Langley et al. ....... 370/395.31 |
| 6,714,972 B1 * | 3/2004 | Lee et al. ............. 709/220 |
| 6,785,279 B1 * | 8/2004 | Crooks ................ 370/392 |
| 6,839,747 B1 * | 1/2005 | Blumenau et al. ....... 709/223 |
| 7,039,015 B1 * | 5/2006 | Vallone et al. ......... 370/252 |
| 2001/0044836 A1 * | 11/2001 | Venkatraman et al. .... 709/218 |
| 2002/0055988 A1 * | 5/2002 | Crooks ................ 709/220 |
| 2002/0062364 A1 * | 5/2002 | Watanabe ............. 709/223 |

(Continued)

OTHER PUBLICATIONS

Byrd, Julie, "Discovering Frame Relay Networks with AutoDiscovery and Layout", Microsoft Technet, www.microsoft.com/technet/archive/visio/frame.mspx?pf=true, pp. 1-3, Aug. 2001.*

(Continued)

Primary Examiner—Bunjob Jaroenchonwanit
Assistant Examiner—Dohm Chankong
(74) Attorney, Agent, or Firm—Withers & Keys, LLC

(57) ABSTRACT

A system for remotely displaying network configuration information, the system comprising a frame relay network comprising at least one permanent virtual connection, wherein the permanent virtual connection has an endpoint associated with a data link connection identifier (DLCI); a network management system, in communication with the frame relay network, capable of storing the DLCI; and a remote access module, in communication with the network management system, capable of remotely displaying the DLCI.

4 Claims, 4 Drawing Sheets

U.S. PATENT DOCUMENTS

2002/0165955 A1* 11/2002 Johnson et al. ............. 709/224
2004/0004966 A1* 1/2004 Foster et al. ................ 370/399
2004/0160904 A1* 8/2004 Enomoto et al. ........... 370/256
2004/0213221 A1* 10/2004 Civanlar et al. ............. 370/389
2004/0215707 A1* 10/2004 Fujita et al. ................ 709/201
2005/0044139 A1* 2/2005 Christian et al. ............ 709/203

OTHER PUBLICATIONS

"Solving Frame Relay Problems", pp. 1-14, http://www.stat.ufl.edu/system/man/portmaster/trouble/FRelay.fm.html, May 17, 2000.*

* cited by examiner

DLCI Quick Reference Database

*DLCI Search*

| DLCI LPort Extensions | |
|---|---|
| State | State Extension |
| Georgia | GAC |
| Tennesee | TNC |
| North Florida | NFC |
| South Florida | SFC |
| Louisiana & Mississippi | LMC |
| Alabama & Kentucky | 148 |
| North Carolina & South Carolina | CAC |

Please enter LPort Name then click Search button. [Note: The Search may take a while. Please be patient .... ]

(Example: 7OQGDA5OOOOO_LMC)

LPort Name: | 7OQGDA5OOOOO_LMC |

[Search] [Reset]

[Home]  [User Login]  [Main Menu]

FIG. 3

DLCI Quick Reference Database

_DLCI List_

DLCI Search Results  (1-10) of (25)

| Src Switch | Src LPortName | Src DLCI | Src Svc Type | Dest Switch | Dest LPortName | Dest DLCI | DestSvc Type | CIR |
|---|---|---|---|---|---|---|---|---|
| JCSNMSCPBB0 | 70QGDA500000_LMC | 360 | FRAME | JCSNMSCPBB6 | 70QLDA500252_LMC | 701 | FRAME | 0 |
| JCSNMSCPBB0 | 70QGDA500000_LMC | 361 | FRAME | JCSNMSCPBB6 | 70QLDA500253_LMC | 701 | FRAME | 1600 |
| JCSNMSCPBB0 | 70QGDA500000_LMC | 406 | FRAME | JCSNMSCPBB6 | 70QLDA500233_LMC | 701 | FRAME | 0 |
| JCSNMSCPBB0 | 70QGDA500000_LMC | 420 | FRAME | JCSNMSCPBB6 | 70QLDA500221_LMC | 701 | FRAME | 0 |
| JCSNMSCPBB0 | 70QGDA500000_LMC | 425 | FRAME | JCSNMSCPBB6 | 70QLDA500219_LMC | 701 | FRAME | 0 |
| JCSNMSCPBB0 | 70QGDA500000_LMC | 436 | FRAME | JCSNMSCPBB6 | 70QLDA500213_LMC | 701 | FRAME | 0 |
| JCSNMSCPBB0 | 70QGDA500000_LMC | 447 | FRAME | JCSNMSCPBB6 | 70QLDA500231_LMC | 701 | FRAME | 0 |
| JCSNMSCPBB0 | 70QGDA500000_LMC | 451 | FRAME | JCSNMSCPBB6 | 70QLDA500234_LMC | 701 | FRAME | 0 |
| JCSNMSCPBB0 | 70QGDA500000_LMC | 456 | FRAME | JCSNMSCPBB6 | 70QLDA500227_LMC | 701 | FRAME | 0 |
| JCSNMSCPBB0 | 70QGDA500000_LMC | 471 | FRAME | JCSNMSCPBB1 | 70QLDA500203_LMC | 701 | FRAME | 0 |

Next   Last

Home   User Login   Main Menu   DLCI Search

PROVISIONING DATA LINK CONNECTION IDENTIFIERS IN A COMMUNICATIONS NETWORK

BACKGROUND OF THE INVENTION

1. Field of Invention

The subject matter disclosed herein relates generally to communications services and, more particularly, to a system and method for provisioning data link connection identifiers in a communications network.

2. Description of the Background

A frame relay network relies on virtual connections to support the exchange of data through an intervening network from an originating system to a remote destination system. A permanent virtual connection, or PVC, refers to a connection that remains established even when data are not being sent. A data link connection identifier (DLCI) is a number used to identify a PVC endpoint in the frame relay network. The DLCI is contained in a 2-byte header that attaches to data frames passing through the network, allowing the frames to be sent to their proper destinations. The DLCI has local significance only, meaning that each PVC on a particular physical port must have a different DLCI number. The DLCI may be the same or different from the DLCI used at the other end.

To configure a new circuit, network technicians typically query a network management application to obtain a list of the assigned DLCIs for a certain physical or logical port. While network technicians working in, for example, a data customer support center (DCSC) have access to the network management application, service consultants (SCs) and system designers (SDs) working in the field do not. Consequently, the SCs and SDs must contact the DCSC to provision a DLCI for a new circuit. Typically, the SCs and SDs call the DCSC to obtain, usually by fax, a list of PVCs connected to a certain network element. The SCs and SDs then use the list of assigned DLCIs to select a new one for the new circuit. The process of transmitting this information to offsite personnel is resource-intensive and procedurally inefficient.

A system and method for provisioning DLCIs in a communications network is needed that allows SCs and SDs access network configuration information in a simple and convenient manner. The architecture should provide sufficient flexibility so that SCs and SDs can access this information in a timely fashion while minimizing the burden on DCSC staff members.

SUMMARY OF THE INVENTION

The subject matter disclosed herein is directed to a system for remotely displaying network configuration information, the system comprising a frame relay network comprising at least one permanent virtual connection, wherein the permanent virtual connection has an endpoint associated with a data link connection identifier (DLCI); a network management system, in communication with the frame relay network, capable of storing the DLCI; and a remote access module, in communication with the network management system, capable of remotely displaying the DLCI. The remote access module may comprise a web server device for communication with a client device and for communication with the network management system and a network management module, for communicating with the network management system via the server device.

Embodiments may be used, for example, to provision data link connection identifiers in a communications network. For example, embodiments may be used in the provision of communications services to create a new permanent virtual circuit or PVC in a frame relay network. A permanent virtual connection, or PVC, refers to a connection that remains established even when data are not being sent. A data link connection identifier (DLCI) is a number used to identify a PVC endpoint in the frame relay network. The DLCI is contained in a 2-byte header that attaches to data frames passed through the network, allowing the frames to be sent to their proper destinations. Where each PVC on a particular physical port must have a different DLCI number, embodiments may be employed to provision a DLCI for a new PVC that differs from those DLCIs already assigned to existing PVCs.

DESCRIPTION OF THE FIGURES

For the subject matter herein to be understood clearly and readily practiced, embodiments will be described in conjunction with the following figures, wherein:

FIG. 2 is an exemplary web page for accepting a logical or physical port name in connection with a DLCI query, according to another embodiment;

FIG. 3 is an exemplary web page for communicating the results of the DLCI query to the user, according to another embodiment.

DETAILED DESCRIPTION OF THE INVENTION

It is to be understood that the figures and descriptions of the embodiments have been simplified to illustrate elements that are relevant for a clear understanding of the subject matter herein while eliminating, for purposes of clarity, other elements. For example, certain details of a communications network are not described herein. Those of ordinary skill in the art will recognize, however, that these and other elements may be desirable in a typical communications network. A discussion of such elements is not provided because such elements are well known in the art and because they do not facilitate a better understanding of the embodiments.

Figure 1:
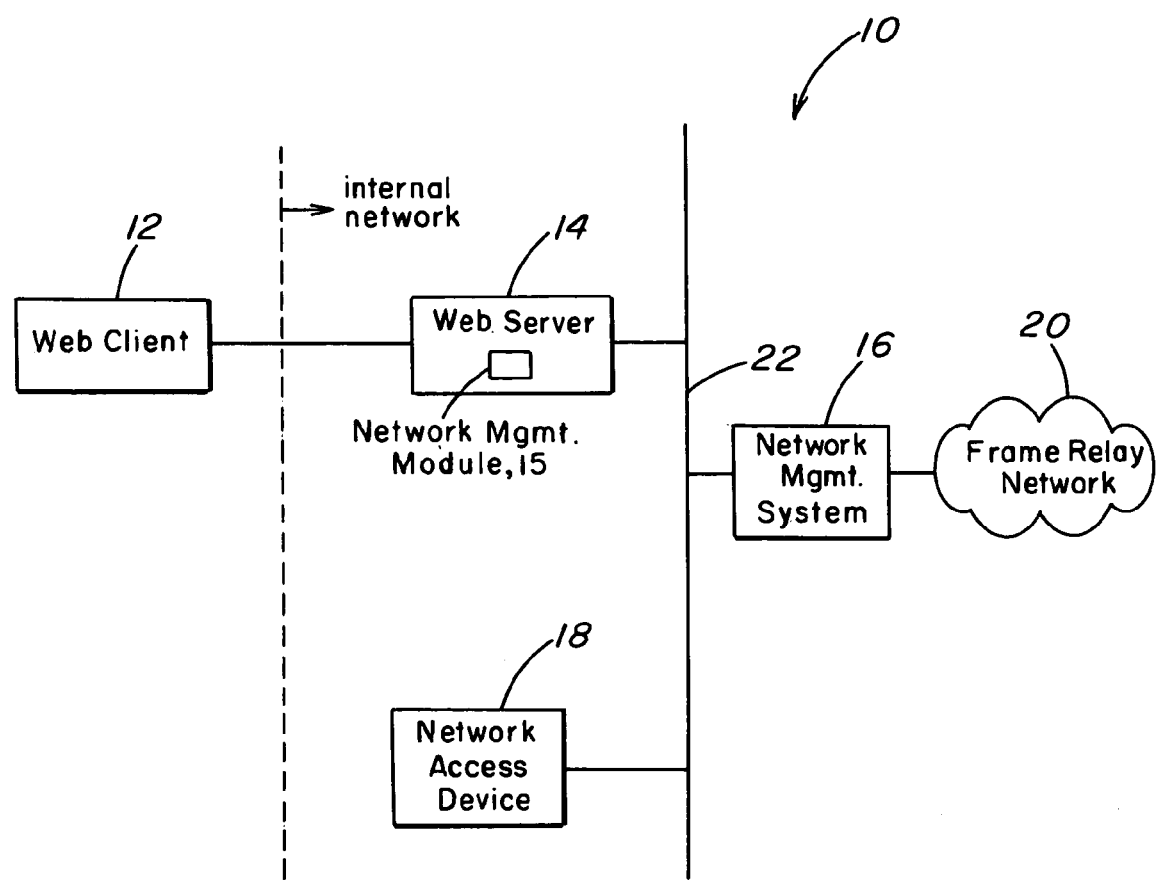
FIG. 1 is a simplified schematic diagram of a system for provisioning data link connection identifiers in a communications network according to one embodiment.

FIG. 1 is a simplified schematic diagram of a system 10, according to one embodiment, for provisioning data link connection identifiers in a communications network. The system 10 includes a web client 12, a web server 14, a network management module 15, a network management system 16, a network access device 18, and a frame relay network 20. The system 10, as discussed further below, provides remote access to network information such as the DLCIs for a particular physical or logical port. According to the subject matter disclosed herein, users may access the network management system 16 by using either conventional means, such as the network access device 18, or the web client 12, which may reside outside of an internal network. Those skilled in the art will appreciate that the network access device 18 in FIG. 1 is shown simply to illustrate a conventional access path and does not fall within the scope of the subject matter disclosed herein.

The web client 12 may be any device capable of visually presenting the information received from the server 14. According to one embodiment, the web client 12 stores a number of computer programs, including a "browser," such as Netscape Navigator. As known in the art, a browser is used to communicate with the web server 14 and to visually present the information received from such a server. Those skilled in the art will recognize, however, that other web clients can be used without departing from the principles of the embodiments, provided such clients are compatible with the system 10 and are able to perform the steps of the provisioning method, as described below. In addition, although the embodiments are discussed in the context of a client-server type of communication model, it should be understood that the principles of the embodiments are equally applicable to peer-to-peer networks.

Web server 14 refers to one or more server computers of the type well known in the art. The server 14, which may have local storage, may store the network management module 15 to minimize system latency. According to one embodiment, module 15 may be implemented as a web site. One of ordinary skill in the art will realize, however, that module may be implemented at any level, ranging from hardware to application software.

The network management module 15 may be implemented as software code, to be executed on any suitable hardware device such as the web server 14, using any suitable computer language such as, for example, Java, HTML, C or C++ using, for example, conventional or object-oriented techniques. The software code may be stored as a series of instructions or commands on a computer readable medium, such as random access memory (RAM), read only memory (ROM), a magnetic medium such as a hard-drive or a floppy disk, or an optical medium such as CD-ROM. According to one embodiment (not shown), the module 15 may reside on a physical device separate from the web server 14.

The network management system 16 may be a centralized network management application, such as NavisCore™ by Lucent Technologies, for managing the network elements in the frame relay network 20. The network management system 16 harvests statistics and other network information from the network 20 in-band over the network or, as shown in FIG. 1, over an out-of-band network using a network management protocol such as simple network management protocol (SNMP).

The frame relay network 20 is comprised of a plurality of network elements, including switches, connected using permanent virtual circuits (PVCs). It would be apparent to one skilled in the art that the network 20 can be configured in ring, full mesh, or partial mesh topologies, or combinations thereof without departing from the principles of the subject matter disclosed herein.

According to the embodiments, the web client 12 is coupled to the web server 14 and communicates using, for example, the Hypertext Transfer Protocol (HTTP), which is a known application protocol that provides users access to files (e.g., text, graphics, images, sound, video, etc.) using a standard page description language, such as HTML. The web server 14 is coupled to the network management system 16 over a local area network (LAN) 22. The LAN 22 may be implemented using, for example, packet-switched Transmission Control Protocol/Internet Protocol (TCPIIP) over an Ethernet, Fast Ethernet or Token Ring network. The network access device 18 is also coupled to the network management system 16 via the LAN 22. Finally, the network management system 16 is coupled to the network 20 over, for example, a high-speed connection such as a T1 line. Those skilled in the art will appreciate that the hardware and software interfaces between elements shown in FIG. 1 are conventional and do not fall within the scope of the subject matter disclosed herein.

The embodiments operate in the above-described environment to facilitate provisioning data link connection identifiers in a communications network. First, using the web client 12, the user inputs a URL (Uniform Resource Locator) to invoke the network management module 15. The URL represents the address of the entry point to the web site embodying module 15 (e.g., the home page for the web site). Upon entering the URL, the web client 12 makes an HTTP request to the web server 14 hosting the module 15. The web server 14, in turn, processes the request and supplies the client with the requested information in an HTML formatted web page.

After the user connects to the web server 14, an authentication process will occur. The authentication process may be a user directed process using, for example, a login and password protocol. User access to the network management system 16 can be associated with an access level determined by a user login or other user validation. Multiple access levels may be used, for example, to permit administrator rights to certain users and limit others to read-only access. In general, the process of reading and authenticating a username and password is well known to those skilled in the art.

FIG. 2 is an exemplary web page 50 for accepting a logical or physical port name in connection with a DLCI query, according to one embodiment of the present invention. Once logged in, the module 15 transmits the web page 50 to the display of the web client 12 and awaits input from the user. The user then inputs a logical or physical port name and submits that information to module 15. Module 15, in turn, compiles a list of PVCs associated with the specified port and transmits the results to the display of the web client 12.

FIG. 3 is an exemplary web page 60 for communicating the results of the DLCI query to the user, according to one embodiment. The web page 60 may comprise, for example, nine columns including the source switch 62, the source logical port name 64, the source DLCI 66, the destination switch 68, the destination port 70, the destination DLCI 72, the destination service type 74, and the committed information rate 76. The first four columns 62, 64, 66, and 68 identify the characteristics of an originating system. The source switch 62, port 64, and DLCI 66 identify the physical and logical locations of the PVC. The source service type 68 refers to the type of service available on a certain PVC, such as frame relay or ATM. Likewise, the next four columns 70, 72, 74, and 76 identify the same characteristics of a remote destination system. The last column of web page 60 identifies the committed information rate or CIR 76, which refers to a bandwidth (expressed in bits per second) associated with a logical connection in a PVC. One skilled in the art will appreciate that the source and destination information shown on the web page 60 is merely representative and may require customization, such as to comply with customer proprietary network information (CPNI) regulations, without departing from the principles of the invention.

A service consultant (SC) or service designer (SD) then uses this information to select an unassigned DLCI for a particular logical or physical port. For example, referring again to FIG. 3, an SC or SD will select a DLCI not listed in the column 66, when setting up a source side PVC, or in column 74, if setting up a destination side PVC. For the source port 70QGDA500000_LMC, the SC or SD could choose a source DLCI of, for example, 450. Likewise, the SC or SD could use the same DLCI, 450, for the destination-side of the PVC because only 701 is assigned and DLCIs have local significance only.

Figure 4:
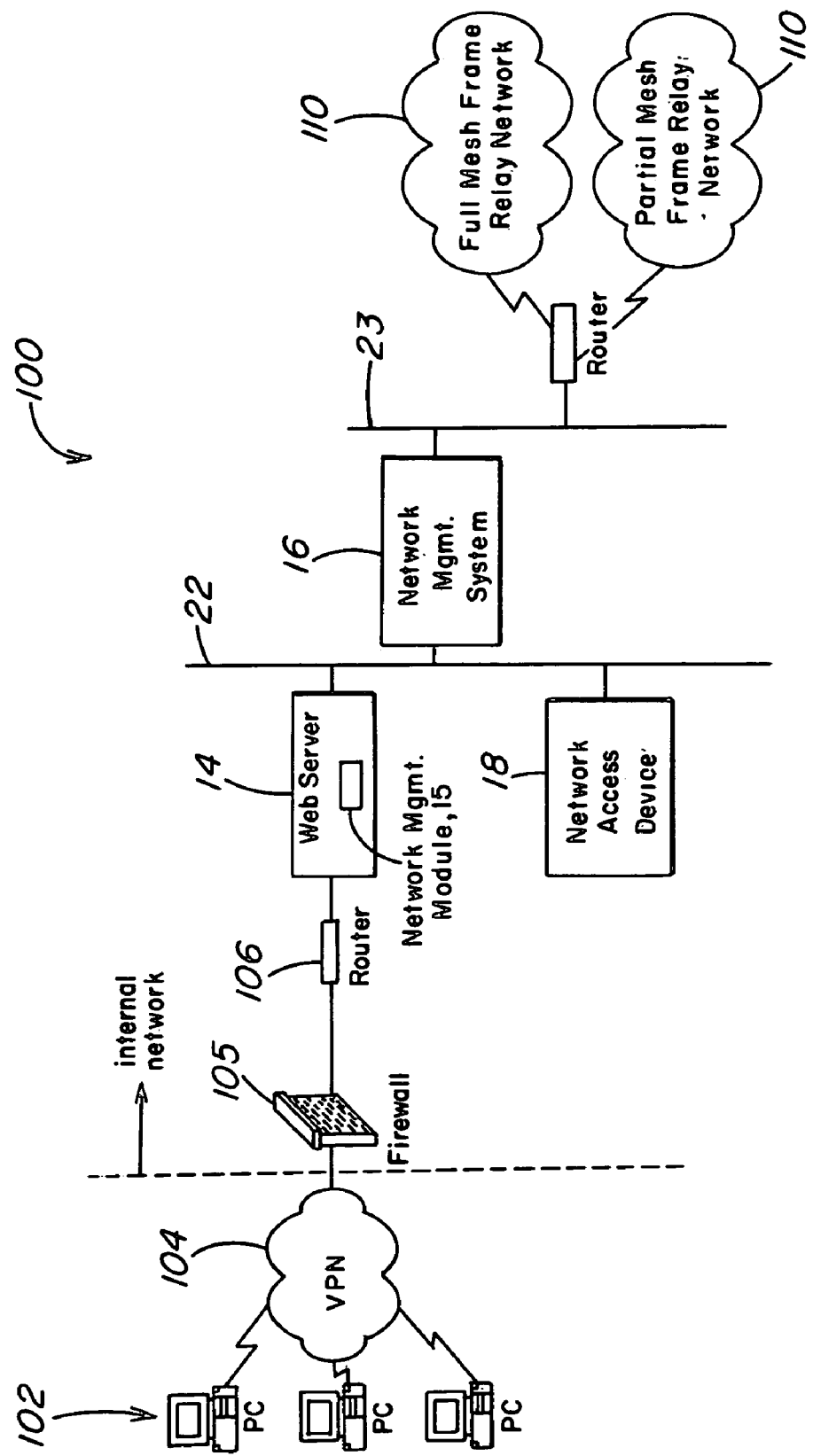
FIG. 4 is a simplified schematic diagram of a system for provisioning data link connection identifiers in a communications network according to another embodiment.

FIG. 4 is a simplified schematic diagram of a system 100 according to another embodiment. The system 100 includes a plurality of web clients 102, a virtual private network (VPN) 104, a router 106, the web server 14, the network management system 16, a router 108, and a plurality of frame relay networks 110. The embodiments send requests from the web clients 102 to the web server 14 via the VPN 104, which interconnects end user locations using encrypted traffic sent via "tunneling" over the Internet.

According to the embodiment illustrated in FIG. 4, the web clients 102 may access the web server 14 using a variety of edge access methods including, for example, a cable modem, a digital subscriber line, or a dial-up modem. The web clients 102 establish a secure connection to the web server 14 using, for example, an extranet client over the VPN 104. The VPN 104 is coupled via firewall 105 to the router 106. The firewall 105 is a system, usually a combination of hardware and software, that enforces a security policy on communication traffic entering and leaving the internal network. Beyond the firewall, the communication traverses through the network, as described above, to reach the network management system 16. The network management system 16, in turn, communicates with the plurality of frame relay network over a LAN 23.

It should be understood that the embodiments disclosed herein are not limited by the foregoing description, but embraces all such alterations, modifications, and variations in accordance with the spirit and scope of the appended claims.

What is claimed is:

1. A method for provisioning a data link connection identifier in a first network upon a request from a browser wherein the first network comprises at least one permanent virtual connection, and wherein the virtual connection is associated with one or more existing identifiers, the method comprising:
   connecting a network management system to the first network, the network management system storing the one or more existing identifiers prior to the request from the browser;
   connecting a network management module to the network management system via a second network to obtain the one or more existing identifiers, the network management module:
      residing within a web server;
      compiling the one or more existing identifiers upon receiving the request from the browser, the request including a geographic selection chosen from a group consisting of a state, a group of states and a portion of a state; and
   querying the network management system with the network management module over the second network for the one or more existing identifiers;
   provisioning a source identifier and a destination identifier to create a new permanent virtual connection between two logical ports;
   remotely displaying the one or more existing identifiers in a web page over an external third network using the network management module in response to the browser request, the request containing at least one of a logical and physical port name, wherein further the web page comprises existing identifier information associated with each of the existing identifiers of a source switch and a destination switch consisting of an identification of the Source Switch, a Source Logical Port Name, a Source DLCI, a Source Service Type, an identification of the Destination Switch, a Destination Logical Port Name, a Destination DLCI, a Destination Service Type and a Committed Information Rate;
   viewing the one or more existing identifiers by a service technician, and
   choosing, by the service technician both the source identifier and the destination identifier to create the new permanent virtual connection where the source identifier and the destination identifier differ from each of the displayed existing identifiers.

2. The method of claim 1, wherein connecting a network management module includes connecting the network management system using a client-server architecture.

3. The method of claim 2, wherein querying includes querying the network management system with a client device.

4. The method of claim 1, wherein the network is a frame relay network, wherein the identifier is a data link connection identifier (DLCI), and wherein the virtual connection is a virtual circuit.

* * * * *